UNITED STATES PATENT OFFICE.

ROBERT T. KING, OF PANA, ILLINOIS.

IMPROVEMENT IN HARDENING THE SURFACES OF IRON.

Specification forming part of Letters Patent No. 145,110, dated December 2, 1873; application filed October 18, 1873.

*To all whom it may concern:*

Be it known that I, ROBERT T. KING, of Pana, in the county of Christian and State of Illinois, have invented a new and Improved Compound for Case-Hardening Iron, of which the following is a specification:

The object of this invention is to furnish a suitable compound for case-hardening iron, or converting the surface into steel; and it consists in a combination of various ingredients or substances, which form the composition hereinafter mentioned, and used in about the proportions named, for forming the compound, viz: Lamp-black, sixteen parts; sal-soda, eight parts; muriate of soda, four parts; black oxide of manganese, one part.

These substances are combined in the above proportions, (by weight,) and are finely powdered.

The iron is heated in any suitable forge or furnace, and, having been wrought into the shape of the implement or article to be used, and the surface thereof prepared by grinding, the compound is applied by sprinkling or sifting, or by immersing the iron therein. The effect is to carbonize and steelify the surface of the iron to a greater or less extent.

A thinner or thicker scale of steel is formed by varying the quantity of the compound applied or the temperature of the iron to be case-hardened.

I do not confine myself to the exact proportions named above, as variations may be made without departing from my invention.

Having thus described my invention, I claim as new and desire to secure by Letters Patent—

The within-described compound, substantially as and for the purposes herein shown and described.

ROBERT T. KING.

Witnesses:
  WILLIAM A. BROWNING,
  PHILIP M. NICHOLS.